(12) United States Patent
Compeau et al.

(10) Patent No.: US 10,694,889 B2
(45) Date of Patent: *Jun. 30, 2020

(54) HANDLE COMPRISING A THERMOELECTRIC GENERATOR

(71) Applicant: SEB S.A., Ecully (FR)

(72) Inventors: Jean-Louis Compeau, Saint Quentin Fallavier (FR); Benoît Linglin, Saint Martin Bellevue (FR)

(73) Assignee: SEB S.A. (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/515,408

(22) PCT Filed: Sep. 28, 2015

(86) PCT No.: PCT/FR2015/052575
§ 371 (c)(1),
(2) Date: Mar. 29, 2017

(87) PCT Pub. No.: WO2016/051056
PCT Pub. Date: Apr. 7, 2016

(65) Prior Publication Data
US 2017/0224154 A1    Aug. 10, 2017

(30) Foreign Application Priority Data

Sep. 30, 2014 (FR) ...................... 14 59228

(51) Int. Cl.
*A47J 36/24* (2006.01)
*A47J 36/06* (2006.01)
(Continued)

(52) U.S. Cl.
CPC ........... *A47J 36/2483* (2013.01); *A47J 36/06* (2013.01); *A47J 37/101* (2013.01); *A47J 45/061* (2013.01);
(Continued)

(58) Field of Classification Search
CPC ...... A47J 36/06; A47J 36/2483; A47J 37/101; A47J 45/074
(Continued)

(56) References Cited

U.S. PATENT DOCUMENTS 2,744,995 A * 5/1956 Jepson .................. A47J 37/105
126/275 E
2,839,662 A * 6/1958 Theisen ................ A47J 37/105
219/436
(Continued)

FOREIGN PATENT DOCUMENTS

CN            201015533 Y      2/2008
EP            2361538 A1       8/2011
(Continued)

*Primary Examiner* — Dana Ross
*Assistant Examiner* — Ket D Dang
(74) *Attorney, Agent, or Firm* — Lerner, David, Littenberg, Krumholz & Mentlik, LLP

(57) ABSTRACT

The invention relates to a handle for a cooking vessel that includes at least one thermoelectric generator thermally connected to a heat sink. The invention is characterised in that the handle has an inner cavity that extends longitudinally over at least one third of the length of the handle, and the heat sink extends longitudinally inside the cavity through at least two thirds of the length thereof.

10 Claims, 2 Drawing Sheets

(51) Int. Cl.
*A47J 37/10* (2006.01)
*A47J 45/06* (2006.01)
*A47J 45/07* (2006.01)

(52) U.S. Cl.
CPC ........... *A47J 45/063* (2013.01); *A47J 45/074* (2013.01); *A47J 2202/00* (2013.01)

(58) Field of Classification Search
USPC .......... 99/470, 331, 337–340, 403–417, 426, 99/422–425, 444–450; 374/179, E07.004; 219/442, 438, 513, 516, 145.21, 234, 219/146.21, 490–495, 618, 627, 521–525, 219/702; 337/323; 128/303.14, 303.17, 128/303.18; 220/752–755, 573.1, 912; 16/110.1
See application file for complete search history.

(56) References Cited

U.S. PATENT DOCUMENTS

| | | | | | |
|---|---|---|---|---|---|
| 2,860,229 | A | * | 11/1958 | Ziegler, Jr. | A47J 37/105 219/436 |
| 2,931,884 | A | * | 4/1960 | Jepson | H01H 37/28 219/436 |
| 3,025,384 | A | * | 3/1962 | Schwaneke | A47J 37/105 219/438 |
| 3,121,781 | A | * | 2/1964 | Schoenwald | B23K 3/0361 219/237 |
| 3,146,339 | A | * | 8/1964 | Jepson | A47J 27/004 219/442 |
| 3,384,195 | A | * | 5/1968 | Jepson | A47J 37/105 219/438 |
| 4,074,718 | A | * | 2/1978 | Morrison, Jr. | A61B 18/1402 219/145.21 |
| 4,173,179 | A | * | 11/1979 | Arthur | A47J 37/105 219/386 |
| 4,308,012 | A | * | 12/1981 | Tamler | A61B 5/0534 433/32 |
| 4,555,371 | A | * | 11/1985 | Jeans | B67D 1/0021 141/29 |
| 4,798,934 | A | * | 1/1989 | Boyer | B23K 3/0346 16/431 |
| 4,948,946 | A | * | 8/1990 | Fukunaga | B08B 15/04 219/230 |
| 5,862,571 | A | * | 1/1999 | Naft | B29C 44/12 16/430 |
| 6,423,942 | B1 | * | 7/2002 | Liao | A45D 1/04 132/229 |
| 6,552,904 | B2 | * | 4/2003 | Fung | B25F 5/008 165/185 |
| 8,783,947 | B2 | * | 7/2014 | Ferron | A47J 45/068 220/756 |
| 2006/0213033 | A1 | * | 9/2006 | Wasserman | A47J 45/061 16/421 |
| 2007/0138191 | A1 | * | 6/2007 | LeGreve | A47J 45/061 220/755 |
| 2007/0228056 | A1 | | 10/2007 | Hoff et al. | |
| 2008/0290104 | A1 | | 11/2008 | Ng et al. | |
| 2011/0268153 | A1 | * | 11/2011 | He | A47J 37/108 374/179 |
| 2011/0284047 | A1 | * | 11/2011 | Johnson | A47J 33/00 136/205 |
| 2014/0148653 | A1 | * | 5/2014 | McMahon | A61B 1/00105 600/223 |
| 2014/0157605 | A1 | * | 6/2014 | Hsieh | A47J 36/24 30/165 |
| 2014/0158334 | A1 | | 6/2014 | Dellea et al. | |
| 2017/0224175 | A1 | * | 8/2017 | Compeau | A47J 45/071 |

FOREIGN PATENT DOCUMENTS

| | | |
|---|---|---|
| EP | 2606791 A1 | 6/2013 |
| FR | 2977121 A1 | 12/2012 |
| WO | 2004/008923 A2 | 1/2004 |
| WO | 2009/147688 A1 | 12/2009 |
| WO | 2013/130365 A1 | 9/2013 |

* cited by examiner

A-A

… (US 10,694,889 B2)

HANDLE COMPRISING A THERMOELECTRIC GENERATOR

CROSS-REFERENCE TO RELATED APPLICATIONS

This application is the United States national phase of International Application No. PCT/FR2015/052575 filed Sep. 28, 2015, and claims priority to French Patent Application No. 1459228 filed Sep. 30, 2014, the disclosures of which are hereby incorporated in their entirety by reference.

BACKGROUND OF THE INVENTION

Field of the Invention

The invention pertains to the field of handles for cooking vessels (also called vessels) or for cooking vessel lids, simply called lids. More precisely, the invention pertains to handles that incorporate power supply means to power electronic functions operating on the principle of thermoelectric energy conversion.

Description of Related Art

Cooking vessels, such as frying pans, are known that use power supply means such as a thermoelectric generator to power an electronic temperature indication system located in the handle. When the frying pans are heated, a heat flow is created. The thermoelectric generator uses this heat flow to produce the electricity required to operate the electronic indication system.

Patent document CN201015533 discloses an electronic pan comprising a body, also called a skirt, as well as a handle that is positioned in a fixed manner on the body of the pan. The pan also comprises a temperature sensor and the temperature can be displayed on a display that is integrated into the handle. To supply power to the sensor and display, the pan comprises a thermoelectric generator that generates electricity to operate the sensor and display. The thermoelectric generator comprises two surfaces, one of which is positioned against the skirt of the pan. To ensure optimal thermal coupling, the thermoelectric generator is placed under pressure against the body of the pan. The skirt of the pan constitutes a heat source for the thermoelectric generator. This document also discloses a heat sink used to promote the cooling of the thermoelectric generator and to create a cooling source required to operate the thermoelectric generator. The heat sink has the form of a metal radiator, comprising fins that are mounted vertically inside the handle to create a current of air for convection cooling, and sufficient air flow with ambient air. The radiator is confined to the end of the handle that is closest to the heat source, i.e., the end of the handle that is closest to the pan.

Such a handle design presents a number of disadvantages.

In order for such a radiator to establish a cooling source capable of creating an electric current in the thermoelectric generator, the fins must be of a sufficient size to properly dissipate heat.

As the fins are mounted vertically inside the handle, their height, and thus the output capacity of the thermoelectric generator, is limited by the height of the handle.

Another disadvantage is related to the position of the radiator within the handle and to the fact that it is confined in a hollow space of the handle positioned at the end of the handle that is closest to the pan and therefore closest to the heat source. The air circulating in this area is very hot, resulting from its convection over the skirt of the pan, from the cooking surface on which the pan is heated, or as it is mixed with flammable gases in the case of a gas cooktop. This implies that the convection of air, required to establish a cooling source (by cooling the radiator) may be disrupted. Moreover, after heating the pan for a certain interval of time, the area in which the radiator is located becomes too hot for the radiator to be able to sufficiently dissipate the heat and the thermoelectric generator is accordingly no longer able to generate electricity.

SUMMARY OF THE INVENTION

The present invention aims to resolve these disadvantages by proposing the creation of a natural convection zone suitable for cooling a heat sink with a sufficient and steady thermal exchange with ambient air, all while maintaining the exterior surface temperature of the handle in accordance with its use as a gripping element.

To this effect, the invention proposes the use of an area that is invulnerable to the circulation of hot gas that may occur with gas cooktops or when close to a heat source. The idea consists in particular of using a large portion of the handle volume and surface area to ensure thermal exchange.

This is achieved using a handle for a cooking vessel or lid comprising at least one thermoelectric generator that is thermally connected to a heat sink; the handle comprises an interior cavity that extends longitudinally across at least one third of the handle length and the heat sink extends longitudinally inside the cavity and across at least two thirds of the length of the cavity.

According to one characteristic of the invention, the heat sink is comprised of one or more fins.

According to one characteristic of the invention, the fins are metal and are made of either aluminum or copper.

According to one embodiment, the fins are heat pipes.

According to one characteristic of the invention, the cavity comprises one or more openings to the exterior.

According to one characteristic of the invention, the handle comprises one or more protection screens positioned over the openings.

According to one characteristic of the invention, the handle comprises a connection part between the thermoelectric generator and the heat sink.

According to one characteristic of the invention, the handle comprises an electronic device connected to the thermoelectric generator.

According to one characteristic of the invention, the electronic device may be an electronic display or electronic sensor.

According to one characteristic of the invention, the handle comprises a micro-fan connected to the thermoelectric generator.

BRIEF DESCRIPTION OF THE DRAWINGS

The objectives, aspects and advantages of the present invention will be better understood with reference to the following description of one particular and non-limiting embodiment of the invention, and to the annexed drawings, in which.

DETAILED DESCRIPTION OF THE INVENTION

Figure 1:
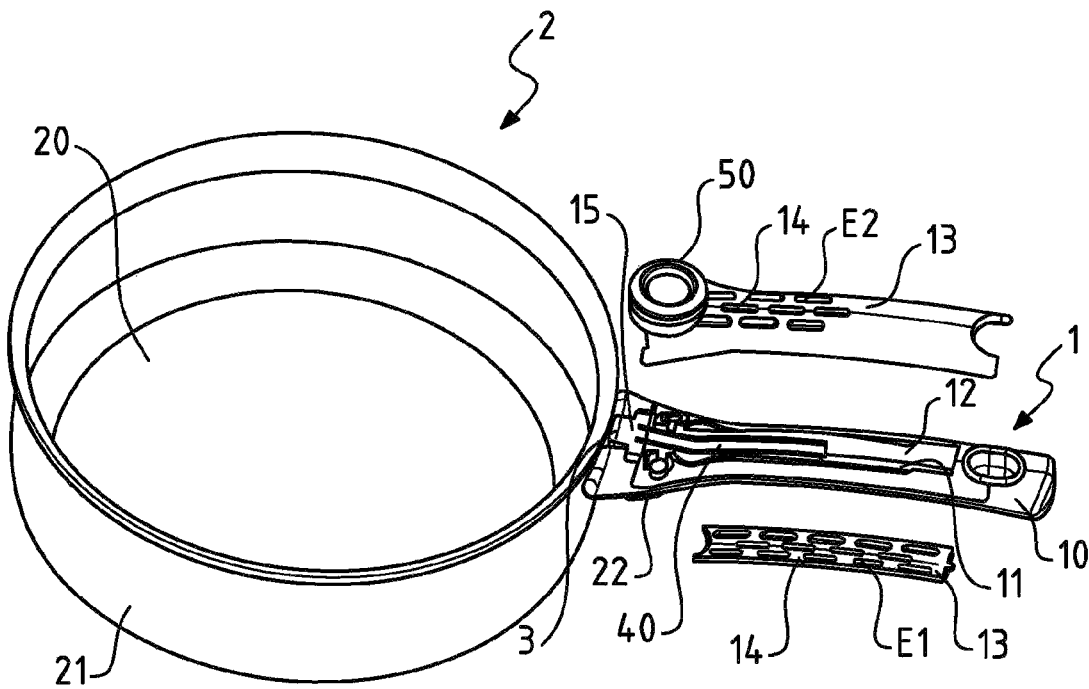
FIG. 1 is an exploded view of a handle for a cooking vessel.

As illustrated in FIG. 1, the cooking vessel (2) (or simply the vessel) comprises a base (20) and a wall (21) that surrounds the base (20). The vessel (2) may be a pan, but may also be a saucepan, stockpot or any other metal container designed to be heated from its base (20). For example, the vessel (2) could be made of aluminum.

The vessel (2) furthermore comprises a handle (1) attached to the wall (21) by a means (22) of attachment. The means (22) of attachment is a mechanical means employing studs, screws or rivets.

More precisely, the handle (1) comprises a main body (10). Preferably, said main body is made of a thermostable material to reduce the risk of overheating. The main body (10) of the handle (1) may also be made of any thermally non-conductive material.

The main body (10) is hollow throughout the length of the handle (1) to obtain an inner cavity (11) (hereafter, simply cavity) containing fins (40) that will be described in greater detail below. For the cavity (11) to serve its cooling function, it must be large enough to sufficiently dissipate heat. To this effect, the cavity (11) extends longitudinally inside the handle (1) and across at least one third of the length of the handle (1), thereby creating a minimal volume required for the cooling function. The cavity (11) may also extend across the entire length of the handle (1).

The cavity (11) comprises an upper opening (12) and a lower opening to the exterior on both sides of the handle (1) that extend across a portion of the handle's length.

Protection screens (13) close off the cavity (11) at the lower and exterior openings (12) to prevent users from accessing the interior of the cavity (11) or the fins (40). Furthermore, these screens (13) comprise openings (14) to ventilate the cavity (11).

The screen (13) openings (14) are either intake openings (E1) through which air is drawn in, or output openings (E2) through which air is released.

The intake openings (E1) are positioned on the lower screen (13), and the output openings (E2) are positioned on the upper screen (13) of the handle (1).

Total surface area S2 represents the combined surface area of all the output (E2) openings (14) and total surface area S1 represents the combined surface area of all the entry (E1) openings (14). To optimize the output of the thermoelectric generator (3), the number and size of these openings (14) must be determined to ensure that total surface S2 is equal to three times length L, which is defined as the combined length of the fins (40). In keeping with the objective of maximizing output, total surface S1 must be greater than total surface S2.

The space created by the cavity (11) makes it possible to contain the various elements required to implement the invention.

Thus the handle (1) comprises a thermoelectric generator (3) positioned inside, or near, the cavity (11). The cavity comprises at least one thermoelectric module, which may be a Peltier module. In the illustrated embodiment, it has two contact surfaces (30, 31). A first (30) contact surface, called the hot surface, is brought into contact with a heat source, while the second (31) contact surface, called the cold surface, is brought into contact with a cooling source.

As shown in FIG. 1, the handle (1) also comprises a connection part (15). This connection part (15) is metal and thermally conductive. The second (31) contact surface of the thermoelectric generator (3) is positioned against this connection part (15) and the two elements are thermally connected.

Generally, the term "thermally connected" means that the contact between the components has a low thermal resistance.

As illustrated in FIG. 1, the handle (1) may also comprise a thermal coupler (16), called simply a coupler. This coupler (16) is thermally connected to the first (30) contact surface of the thermoelectric generator (3). The coupler (16) is designed to come into contact with the wall (21) of the vessel (2) when the handle (1) is attached to the vessel (2). The coupler (16) makes it possible to obtain an effective thermal connection between the thermoelectric generator (3) and the heat source.

Preferably, this coupler (16) is metal and made of either aluminum or copper.

In another embodiment of the handle (1) that is not depicted below, there is no coupler (16) and the first (30) contact surface of the thermoelectric generator (3) is in direct contact with the heat source, which is the wall (21) of the vessel (2).

Figure 2:
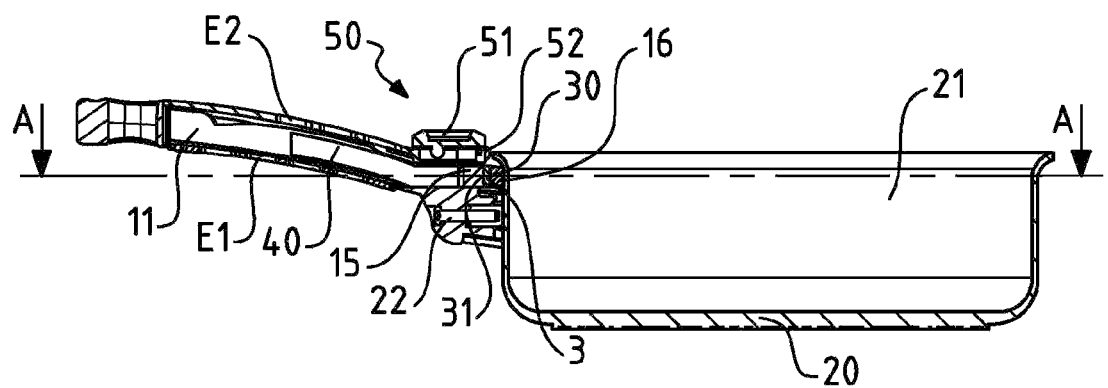
FIG. 2 is a cross-sectional side view of a handle for a cooking vessel.
Figure 3:
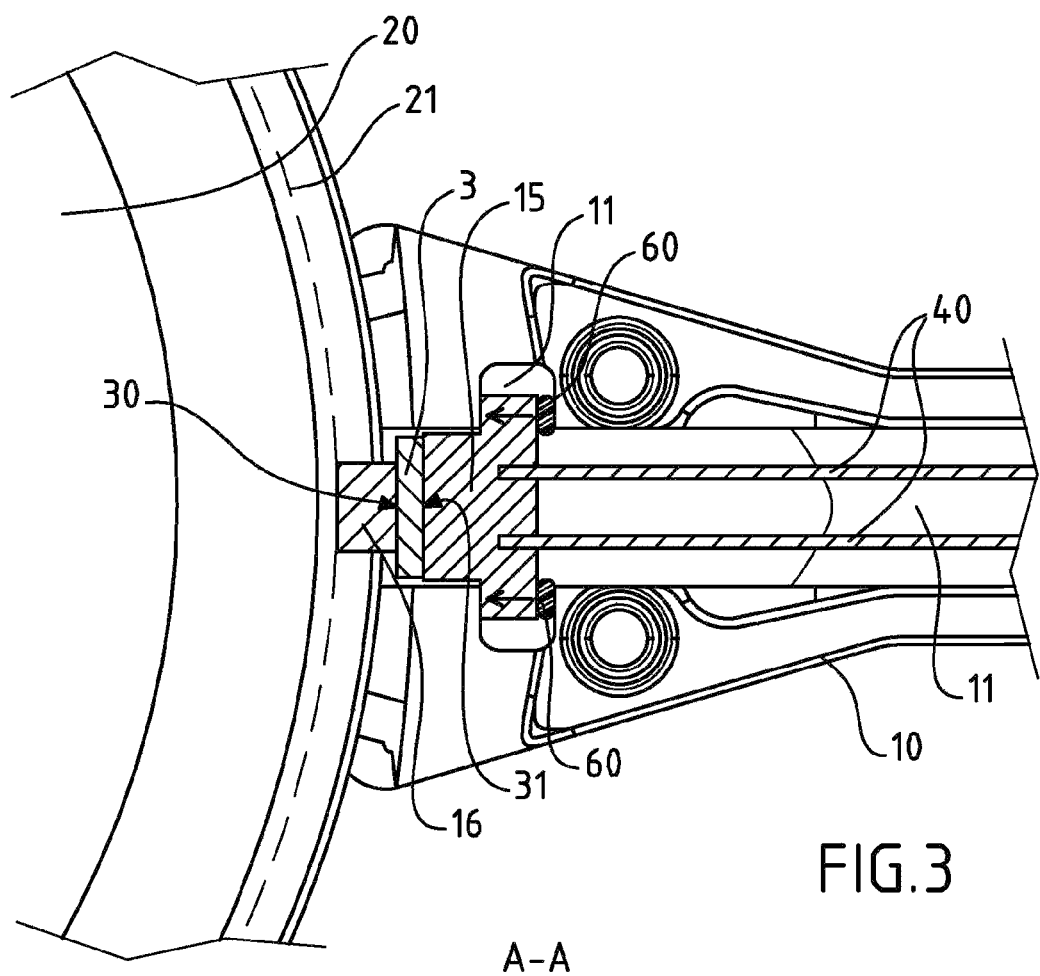
FIG. 3 is a cross-sectional A-A view of FIG. 2.

As depicted in FIG. 1-3, the handle (1) comprises a heat sink (4). This heat sink (4) is contained within the cavity (11) of the handle (1).

The heat sink (4) is thermally connected to the connection part (15) used to hold the heat sink (4).

In one embodiment that is not depicted, there is no connection part (15) and the heat sink (4) is connected directly to the second (31) contact surface of the thermoelectric generator (3).

The heat sink (4) depicted in FIGS. 1-3 is comprised of two fins (40) located inside the cavity (11) of the handle (1). They are oriented longitudinally across the handle (1) and extend across at least two thirds of the length of the cavity (11). These two fins (40) are juxtaposed and preferably parallel with respect to each other. Between the fins (40) there is a space that could range from a few millimeters to one centimeter.

The height, thickness and length of the fins (40) may vary with respect to the desired output of the thermoelectric generator. However the height, thickness and length dimensions depend on the width and height of the cavity (11) or the handle (1).

The fins (40) are preferably metal and thermally conductive. The metal may be aluminum or copper, both of which are good conductors of heat.

In one variation, the fins (40) may be heat pipes.

Furthermore, when the thermoelectric ensemble, comprised of the thermoelectric module, the connection part (15), the fins (40) and the coupler (16), are held under pressure against the wall (21) when the handle (1) is mounted to the vessel (2) via the means of attachment (22), certain pieces are at risk of deterioration.

To this effect, as depicted in FIG. 3, elastomer pads (60) are mounted to the means of attachment (22) of the handle (1) to protect the first (30) contact surface or the coupler (16) that is pressed against the wall (21), from being crushed when the handle (1) is mounted.

As shown in FIG. 2, the handle (1) may also comprise an electronic device (50) connected to the thermoelectric generator (3). The electronic device (50) may be an electronic display (51) or an electronic sensor (52).

The electronic sensor (52) may be, as one non-limiting example, a temperature sensor.

The handle (1) may also comprise a micro-fan (not depicted) connected to the thermoelectric generator (3) to be supplied with power and to accelerate the cooling of the handle.

The invention consists, primarily, of establishing an efficient thermal connection between the first (30) contact surface of the thermoelectric generator (3) and the wall (21) of the cooking vessel (2) that serves as the heat source. This is achieved with either an aluminum coupler (16) to maximize the contact surface with the wall (21) of the vessel (2) when the handle (1) is mounted under pressure against the wall (21) using traditional attachment methods of studs (22) or rivets, or is in direct contact with the first (30) contact surface of the thermoelectric generator (3) and the wall (21) of the cooking vessel (2).

When the vessel (2) is heated, the aluminum wall (21) gradually increases in temperature and constitutes the heat source for the thermoelectric generator (3). This creates a heat flow and the fins (40) inside the handle (1) will eventually heat up in turn. A natural convection of ambient air is produced inside the handle (1) where the cavity is located (11).

The convection takes place through the openings (14) of the protection screen (13). Cold air comes into contact with the fins (40) through the lower openings (14), cools them and then exits through the upper openings (14).

This convection may be accelerated by using a micro fan, not depicted, to accelerate the flow of ambient air through the fins (40).

The objective of this convection process is to create a cooling source in the handle (1) allowing the fins (40) to release heat to the ambient air. Having a convection volume that extends across the handle (1) at a distance from the heat source makes it possible to create an efficient, and even constant, cooling source between the wall (21) of the vessel (2) and the ambient air.

The continuous heat flow that is created then moves across the thermoelectric module and creates a voltage at its terminals that is proportional to the heat flow.

Thus if the heat flux is zero, the voltage would be zero, which is what occurs when the fins (40) do not dissipate enough heat, or in other words, when no cooling source has been established.

In the case of a vessel (2) placed on a 300 W cooktop, the continuous heat flux through the thermoelectric module would range from 3 $W/cm^2$ to 6 $W/cm^2$, corresponding to the generation of 7.2 mW to 14 mW with a voltage range of 1.5-2.7 V.

When the handle (1) comprises an electronic device (50) connected to the thermoelectric generator (3), such as, for example, an electronic display (51), electronic sensor (52) or micro-fan, the electricity generated is sufficient to power these various electronic devices (50).

Various modifications and/or improvements being obvious to a person of ordinary skill in the art may be applied to the embodiment of the invention described by the present while still falling within the scope of the invention as defined in the annexed claims.

The invention claimed is:

1. A handle for a cooking vessel or lid comprising at least one thermoelectric generator that is thermally connected to a heat sink, wherein the handle comprises an inner cavity that extends longitudinally across at least one third of a length of the handle and the heat sink extends longitudinally into the inner cavity and across at least two thirds of a length of the inner cavity, and wherein the inner cavity comprises one or more openings that open the inner cavity to an exterior to allow ambient air to cool the heat sink.

2. The handle for the cooking vessel or lid as in claim 1, wherein the heat sink comprises one or more fins.

3. The handle for the cooking vessel or lid as in claim 2, wherein the one or more fins are metal and are made of either aluminum or copper.

4. The handle for the cooking vessel or lid as in claim 2, wherein the one or more fins are heat pipes.

5. The handle for the cooking vessel or lid as in claim 1, wherein the handle comprises one or more protection screens positioned over the one or more openings.

6. The handle for the cooking vessel or lid as in claim 1, wherein the handle comprises a connection part between the thermoelectric generator and the heat sink.

7. The handle for the cooking vessel or lid as in claim 1, wherein the handle comprises an electronic device connected to the thermoelectric generator.

8. The handle for the cooking vessel or lid as in claim 7, wherein the electronic device is an electronic display or an electronic sensor.

9. The handle for the cooking vessel or lid as in claim 1, wherein the handle comprises a micro-fan connected to the thermoelectric generator.

10. A handle for a cooking vessel or lid comprising at least one thermoelectric generator that is thermally connected to a heat sink, wherein the handle comprises an inner cavity that extends longitudinally across at least one third of a length of the handle and the heat sink extends longitudinally into the inner cavity and across at least two thirds of a length of the inner cavity, wherein the heat sink comprises one or more fins, and wherein the fins are heat pipes, and wherein the inner cavity comprises one or more openings that open the inner cavity to an exterior to allow ambient air to cool the heat sink.

* * * * *